US007660075B1

(12) United States Patent
Lin et al.

(10) Patent No.: US 7,660,075 B1
(45) Date of Patent: Feb. 9, 2010

(54) DISK DRIVE INCLUDING AN ACTUATOR LATCH WITH A PIVOT BALL IN A LATCH POST OPENING AND BETWEEN A VCM TOP PLATE AND THE LATCH

(75) Inventors: Jianren Lin, San Jose, CA (US); Lidu Huang, Danville, CA (US); Nils E. Larson, San Jose, CA (US)

(73) Assignee: Western Digital Technologies, Inc., Lake Forest, CA (US)

( * ) Notice: Subject to any disclaimer, the term of this patent is extended or adjusted under 35 U.S.C. 154(b) by 670 days.

(21) Appl. No.: 11/345,354

(22) Filed: Feb. 1, 2006

(51) Int. Cl.
G11B 5/54 (2006.01)
G11B 21/16 (2006.01)
E05D 7/10 (2006.01)
E05D 7/12 (2006.01)

(52) U.S. Cl. ..................... 360/256.2; 16/258
(58) Field of Classification Search ...... 360/256–256.6; 16/258, 259, 386
See application file for complete search history.

(56) References Cited

U.S. PATENT DOCUMENTS

| | | | |
|---|---|---|---|
| 1,729,968 A * | 10/1929 | Sargent | ........................ 16/258 |
| 3,375,546 A * | 4/1968 | Peterson | ...................... 16/258 |
| 5,703,735 A * | 12/1997 | Bleeke | ..................... 360/256.2 |
| 5,793,572 A | 8/1998 | Lalouette et al. | |
| 6,118,636 A | 9/2000 | Hatch et al. | |
| 6,134,077 A | 10/2000 | Misso et al. | |
| 6,163,440 A | 12/2000 | Takahashi et al. | |
| 6,185,074 B1 | 2/2001 | Wang et al. | |
| 6,215,628 B1 | 4/2001 | Boutaghou | |
| 6,327,119 B1 | 12/2001 | Barina et al. | |
| 6,400,533 B1 | 6/2002 | Liu et al. | |
| 6,507,461 B1 | 1/2003 | Kimura et al. | |
| 6,529,349 B1 | 3/2003 | Byun et al. | |
| 6,535,359 B1 | 3/2003 | Boutaghou | |
| 6,731,468 B2 | 5/2004 | Williams et al. | |
| 2003/0035246 A1 | 2/2003 | Byun et al. | |
| 2003/0086210 A1* | 5/2003 | Miyajima | ................ 360/256.4 |
| 2003/0147179 A1 | 8/2003 | Hashizume et al. | |
| 2004/0141256 A1 | 7/2004 | Hong et al. | |
| 2004/0145832 A1 | 7/2004 | Kanada et al. | |

* cited by examiner

Primary Examiner—Andrea L Wellington
Assistant Examiner—Adam B Dravininkas
(74) Attorney, Agent, or Firm—Barcelo & Harrison, LLP

(57) ABSTRACT

A disk drive includes a housing including a support post extending from the housing. The support post defines a post axis. The disk drive further includes an actuator rotatably coupled to the housing. The disk drive further includes a VCM top plate physically coupled to the housing and comprising a ferromagnetic metal. The disk drive further includes a VCM magnet magnetically coupled to the VCM top plate. The disk drive further includes an actuator latch contactable with the actuator. The latch includes a post opening. The latch is pivotably mounted about the support post with the support post disposed in the post opening. The disk drive further includes a pivot ball disposed in the post opening and partially protruding from the latch between the VCM top plate and the latch along the post axis.

13 Claims, 6 Drawing Sheets

DISK DRIVE INCLUDING AN ACTUATOR LATCH WITH A PIVOT BALL IN A LATCH POST OPENING AND BETWEEN A VCM TOP PLATE AND THE LATCH

FIELD OF THE INVENTION

The present invention relates generally to disk drives, and in particular a disk drive including an actuator latch with a pivot ball in a latch post opening and between a VCM top plate and the latch.

BACKGROUND

The typical hard disk drive includes a head disk assembly (HDA) and a printed circuit board assembly (PCBA) attached to a disk drive base of the HDA. The head disk assembly includes at least one disk (such as a magnetic disk, magneto-optical disk, or optical disk), a spindle motor for rotating the disk, and a head stack assembly (HSA). The printed circuit board assembly includes a servo control system in the form of a disk controller for generating servo control signals. The head stack assembly includes at least one head, typically several, for reading and writing data from and to the disk. In an optical disk drive, the head will typically include a mirror and objective lens for reflecting and focusing a laser beam on to a surface of the disk. The head stack assembly is controllably positioned in response to the generated servo control signals from the disk controller. In so doing, the attached heads are moved relative to tracks disposed upon the disk.

The spindle motor typically includes a rotatable spindle motor hub, a magnet attached to the spindle motor hub, and a stator. Various coils of the stator are selectively energized to form an electromagnetic field that pulls/pushes on the magnet, thereby imparting a rotational motion onto the spindle motor hub. Rotation of the spindle motor hub results in rotation of the attached disks.

The head stack assembly includes an actuator assembly, at least one head gimbal assembly, and a flex circuit assembly. A conventional "rotary" or "swing-type" actuator assembly typically includes an actuator having an actuator body. The actuator body has a pivot bearing cartridge to facilitate rotational movement of the actuator assembly. One or more actuator arms extend from the actuator body. Each actuator arm supports at least one head gimbal assembly that includes a head. An actuator coil is supported by the actuator body opposite the actuator arms. The actuator coil is configured to interact with one or more magnets, typically a pair, to form a voice coil motor (VCM). The printed circuit board assembly controls current passing through the actuator coil that results in a torque being applied to the actuator.

A latching mechanism may be provided to facilitate latching of the actuator in a parked position when the heads are not being used to interact with the tracks on the disk. In the parked position, the actuator is positioned with the heads either at an outer diameter (OD) or inner diameter (ID) of the disk. A crash stop may be coupled to the disk drive base to limit rotation of the actuator in a given direction. The crash stop is configured to contact a portion of the actuator when the actuator is rotated in a given rotational direction. Another crash stop may be provided to limit actuator rotation in an opposite rotational direction. The latching mechanism may additionally function as one of the crash stops.

Moving portions of such latching mechanism may be subject to undesirable friction with other components of the disk drive. For example, a latch arm of the latching mechanism may rub against a VCM top plate and/or disk drive base when the latch arm moves between open and closed positions adjacent the actuator. As such, a topic of concern is the potential for friction between the latching mechanism and the VCM top plate or disk drive base to resist rotation of the latching mechanism. The trend toward decreasing clearance between moving portions of such latching mechanisms and other disk drive components makes such concern more difficult to address.

Accordingly, it is contemplated that there is need in the art for an improved actuator latch configuration.

SUMMARY

According to an aspect of the present invention, there is provided a disk drive. The disk drive includes a disk drive housing including a support post extending from the disk drive housing. The support post defines a post axis. The disk drive further includes an actuator rotatably coupled to the disk drive housing. The disk drive further includes a VCM top plate physically coupled to the disk drive housing. The VCM top plate comprises a ferromagnetic metal. The disk drive further includes a VCM magnet magnetically coupled to the VCM top plate. The disk drive further includes an actuator latch contactable with the actuator. The latch includes a post opening. The latch is pivotably mounted about the support post with the support post disposed in the post opening. The disk drive further includes a pivot ball disposed in the post opening and partially protruding from the latch between the VCM top plate and the latch along the post axis.

According to various embodiments, the pivot ball may be press-fit into the latch. The pivot ball may comprise a ceramic material or a steel. The disk drive housing may include a disk drive base, and the support post may be press-fit attached to the disk drive base. The support post and the disk drive housing may be all a single component having material continuity rather than an assembly of subcomponents. The VCM top plate may comprise steel. The VCM magnet may be physically coupled to the disk drive housing. The disk drive housing may include a disk drive base and a cover. The VCM magnet may be physically coupled to the disk drive base, and the VCM top plate may be physically coupled to the cover. The pivot ball protrudes from the latch between the VCM top plate and the latch along the post axis between 5% and 45% of a diameter of the pivot ball. The pivot ball may be seated upon the support post without contacting the VCM top plate. The pivot ball may be between 50 and 150 micrometers from the VCM top plate in a direction parallel the post axis with the pivot ball seated upon the support post. The pivot ball may be between 50 and 100 micrometers in diameter. The support post may be between 30 and 80 micrometers in diameter.

DESCRIPTION OF THE PREFERRED EMBODIMENTS

Figure 1:
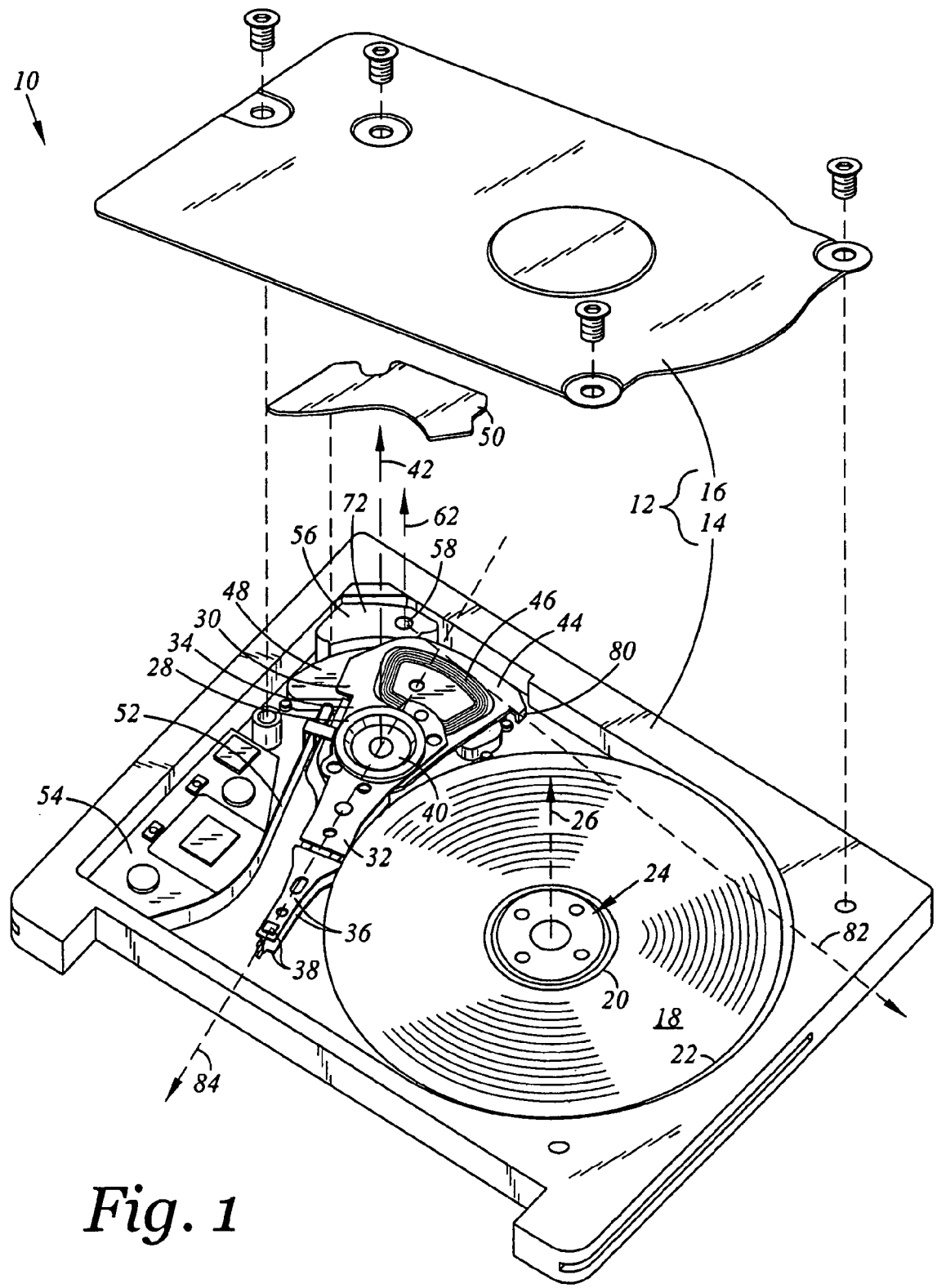
FIG. 1 is an exploded top perspective view of a disk drive including an actuator latch and an actuator according to an embodiment of the present invention.

Referring now to FIG. 1, there is depicted an exploded perspective view of a disk drive 10 according to an embodiment of the present invention. The disk drive 10 includes a head disk assembly (HDA) and a printed circuit board assembly (PCBA) (not shown). The head disk assembly includes a disk drive housing 12 having disk drive housing members, such as a disk drive base 14 and a cover 16. The disk drive base 14 and the cover 16 collectively house a disk 18. A single disk or additional disks may be utilized. The disk 18 includes an inner diameter (ID) 20 and an outer diameter (OD) 22. The disk 18 further includes a plurality of tracks for storing data. The disk 18 may be of a magnetic recording type of storage device, however, other arrangements such as optical recording may be utilized. The head disk assembly further includes a spindle motor 24 for rotating the disk 18 about a disk rotation axis 26. The head disk assembly further includes a head stack assembly 28 rotatably attached to the disk drive base 14 in operable communication with the disk 18. The head stack assembly 28 includes an actuator 30.

The actuator 30 includes an actuator body 32 and actuator arms 34 that extend from the actuator body 32. Distally attached to the actuator arms 34 are suspension assemblies 36. The suspension assemblies 36 respectively support heads 38. The suspension assemblies 36 with the heads 38 are referred to as head gimbal assemblies. It is contemplated that the number of actuator arms and suspension assemblies may vary depending upon the number of disks and disk surfaces utilized.

Each head 38 typically includes a transducer for writing and reading data. Each transducer typically includes a writer and a read element. In magnetic recording applications, the transducer's writer may be of a longitudinal or perpendicular design, and the read element of the transducer may be inductive or magnetoresistive. In optical and magneto-optical recording applications, the head may also include an objective lens and an active or passive mechanism for controlling the separation of the objective lens from a disk surface of the disk 16. The disk 16 includes opposing disk surfaces. In magnetic recording applications the disk surface typically includes one or more magnetic layers. Data may be recorded along data annular regions on a single disk surface or both.

The head stack assembly 28 may be pivoted such that each head 38 is disposed adjacent to the various data annular regions from adjacent to the outer diameter 22 to the inner diameter 20 of the disk 18. In the embodiment shown, the actuator body 32 includes a bore, and the actuator 30 further includes a pivot bearing cartridge 40 engaged within the bore for facilitating the actuator body 32 to rotate between limited positions about an axis of rotation 42.

The actuator 30 further includes a coil support element 44 that extends from one side of the actuator body 32 opposite the actuator arms 34. The coil support element 44 is configured to support a coil 46. A VCM magnet 48 may be physically coupled to the disk drive housing 12. The VCM magnet 48 may be supported by the disk drive base 12 as shown. Posts may be provided to position the VCM magnet 48 in a desired alignment against the disk drive base 12. A VCM top plate 50 may be physically coupled to the cover 16. The VCM top plate may comprise steel. The coil 46 is positioned between the VCM magnet 48 and the VCM top plate 50 to form a voice coil motor for controllably rotating the actuator 30. It is noted that the term "top" as referred to in the term VCM top plate 50 is a relative term as the disk drive 10 is usually depicted as shown. In this regard, it is understood that in a given application, the disk drive could be mounted in a flipped configuration from at as shown.

The head stack assembly 28 further includes a flex cable assembly 52 and a cable connector 54. The cable connector 54 is attached to the disk drive base 12 and is disposed in electrical communication with the printed circuit board assembly. The flex cable assembly 52 supplies current to the coil 46 and carries signals between the heads 38 and the printed circuit board assembly.

With this configuration, current passing through the coil 46 results in a torque being applied to the actuator 30. A change in direction of the current through the coil 46 results in a change in direction of the torque applied to the actuator 30. It is contemplated that other magnet, VCM plate, coil and magnet support configurations may be utilized, such as a multiple coil arrangements, single or double VCM plates and a vertical coil arrangement.

Figures 2, 3:
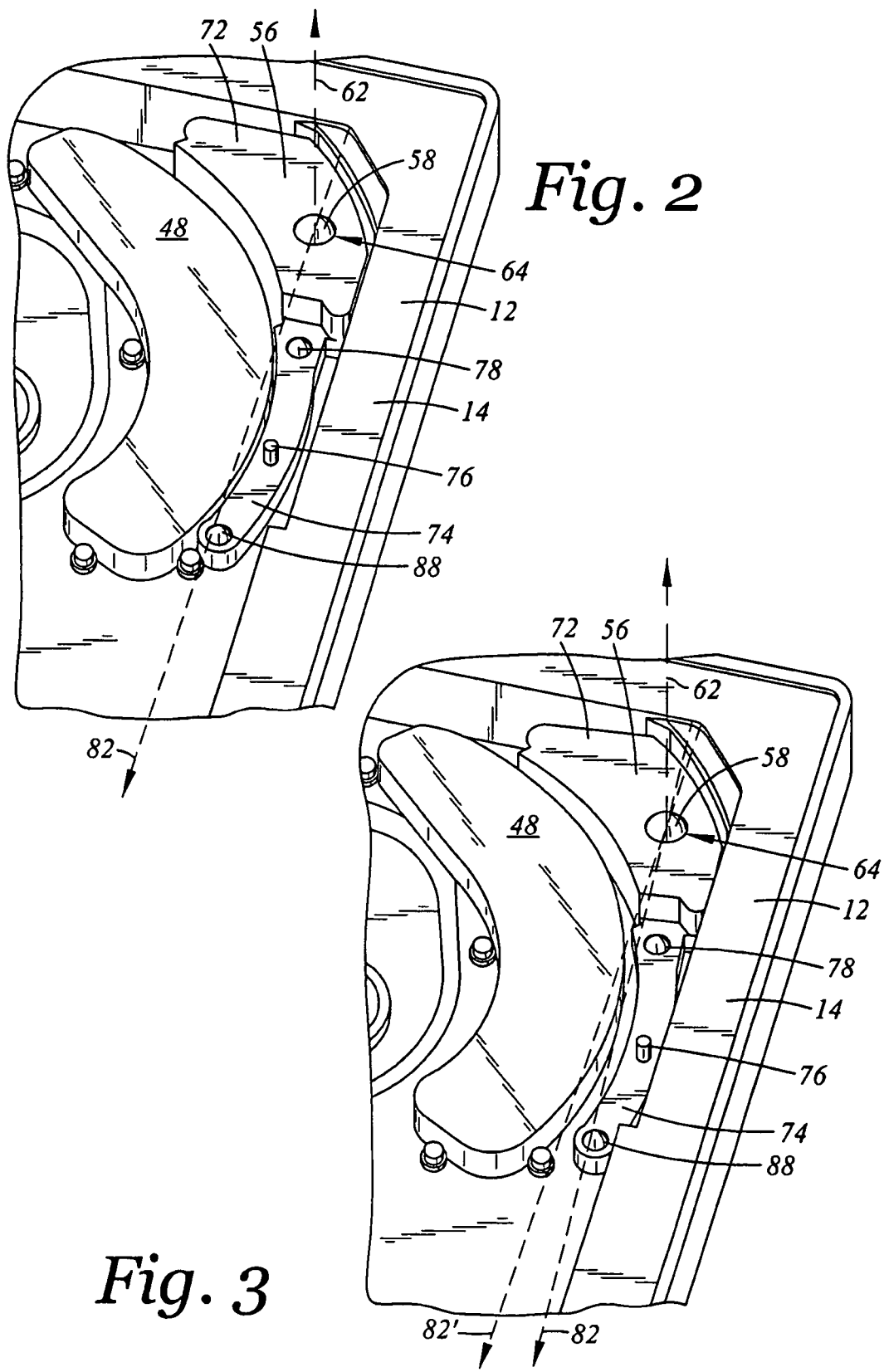
FIG. 2 is an enlarged top perspective view of a portion of a disk drive according to an embodiment of the present invention with an actuator latch in an open position.
FIG. 3 is an enlarged top perspective view of a portion of the disk drive similar to that of FIG. 2, however, with the latch in a closed position.
Figure 4:
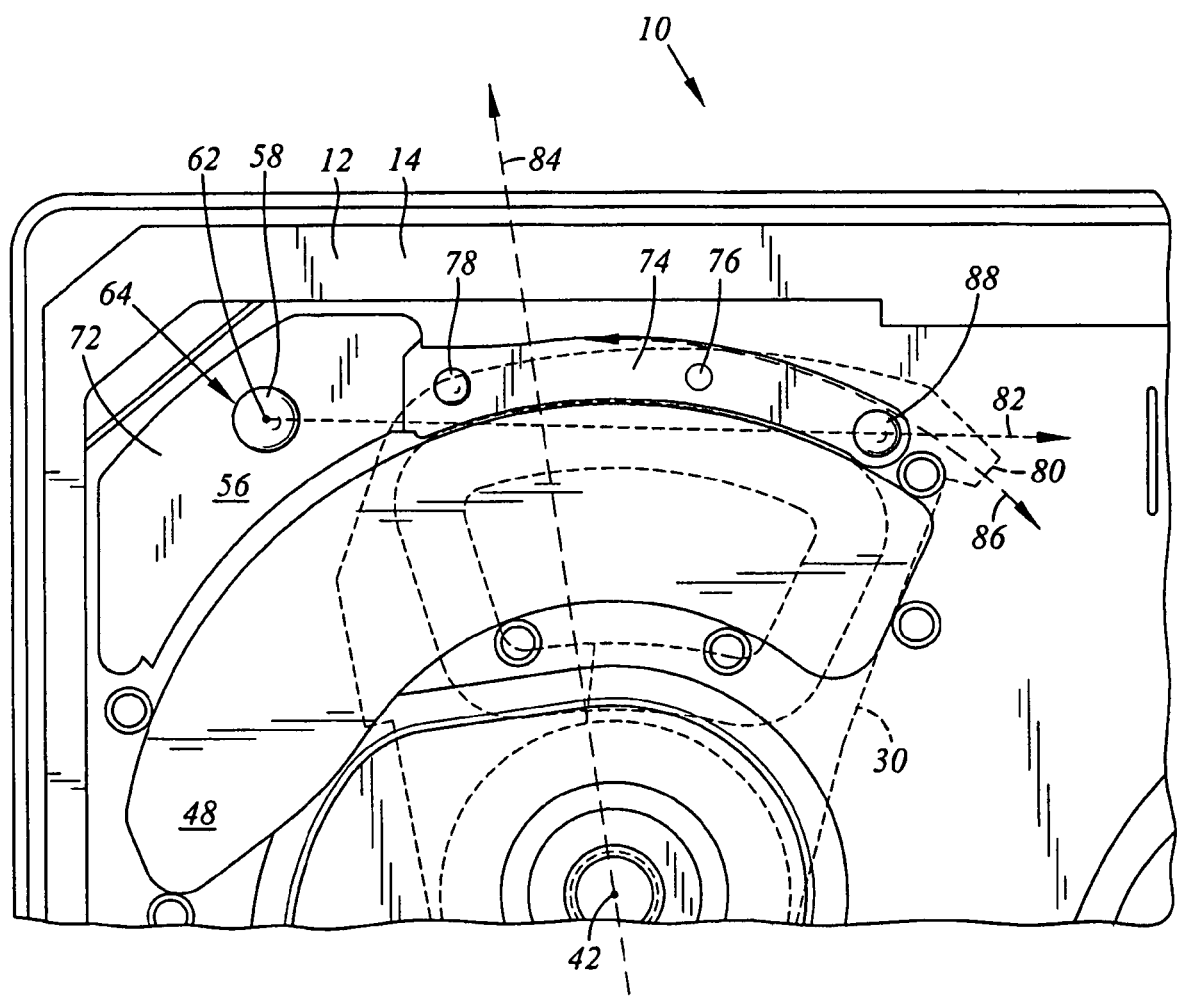
FIG. 4 is an enlarged top plan view of a portion of the disk drive according to an embodiment of the present invention with an actuator latch in a open position (and an actuator in a parked position shown in dashed lining)
Figure 5:
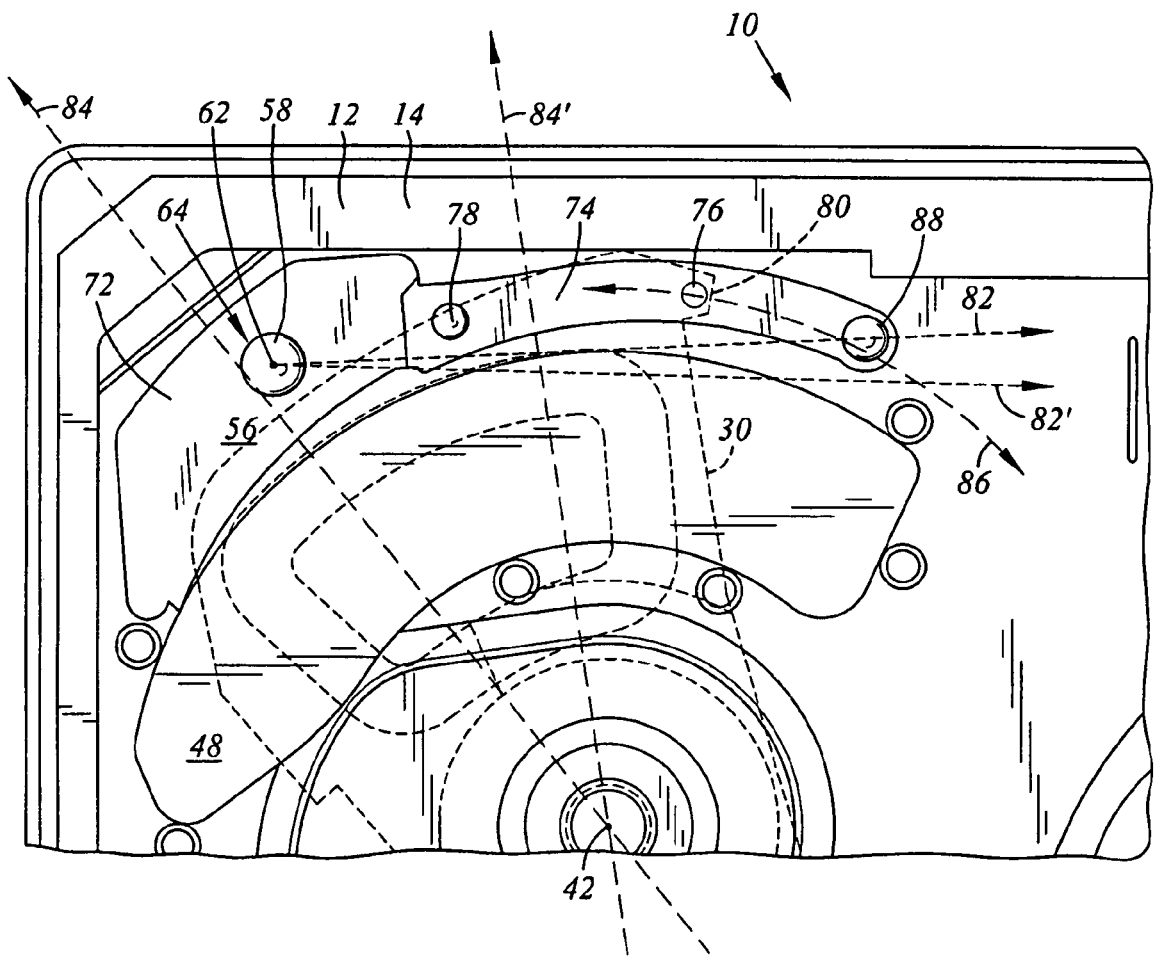
FIG. 5 is an enlarged top perspective view of a portion of the disk drive similar to that of FIG. 4, however, with the latch in a closed position (and the actuator shown in a caught position shown in dashed lining)
Figure 6:
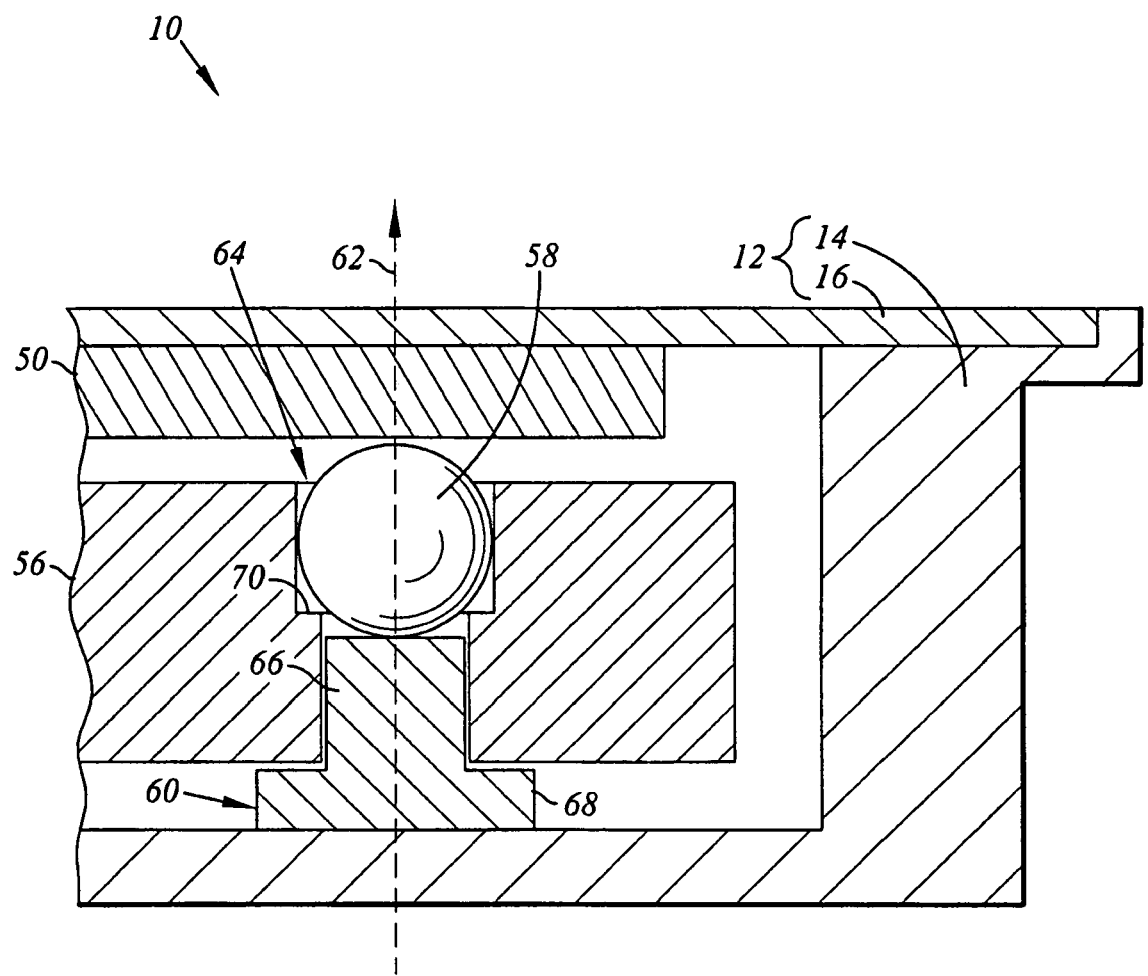
FIG. 6 is an enlarged cross-sectional side view of a portion of the disk drive according to an embodiment of the present invention including a portion of an actuator latch with a pivot ball.
Figure 7:
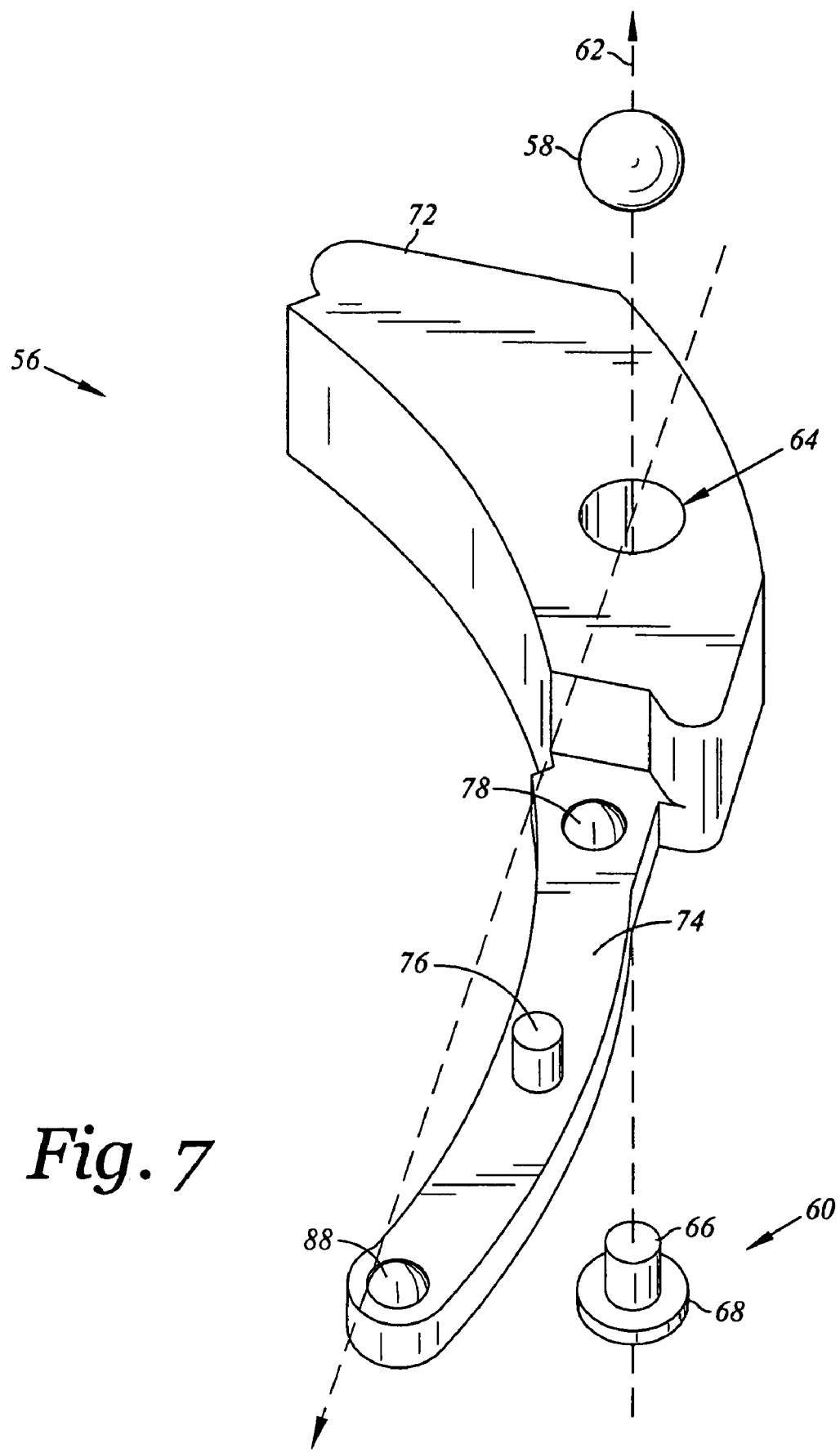
FIG. 7 is an enlarged exploded view of an actuator latch, a pivot ball, and a support post according to an embodiment of the present invention.

As will be discussed in detail below, the disk drive 10 includes an actuator latch 56 and a pivot ball 58 supported by a support post 60. Referring now additionally to FIG. 2 there is depicted an enlarged top perspective view of a portion of the disk drive 10 according to an embodiment of the present invention with the latch 56 in an open position. FIG. 3 is an enlarged top perspective view of a portion of the disk drive 10 similar to that of FIG. 2, however, with the latch 56 in a closed position. FIG. 4 is an enlarged top plan view of a portion of the disk drive 10 according to an embodiment of the present invention with the latch 56 in a open position (and the actuator 30 in a parked position shown in dashed lining). FIG. 5 is an enlarged top perspective view of a portion of the disk drive 10 similar to that of FIG. 4, however, with the latch 56 in a closed position (and the actuator 30 shown in a caught position shown in dashed lining). FIG. 6 is an enlarged cross-sectional side view of a portion of the disk drive 10 according to an embodiment of the present invention including a portion of the latch 56, the pivot ball 58, and support post 60. FIG. 7 is an enlarged exploded view of the latch 56, pivot ball 58 and the support post 60 according to an embodiment of the present invention.

In the embodiments of FIGS. 1-7, the disk drive 10 includes the disk drive housing 12 including a support post 60 extending from the disk drive housing 12. The support post 60 defines a post axis 62. The disk drive 10 further includes the actuator 30 rotatably coupled to the disk drive housing 12. The disk drive 10 further includes the VCM top plate 50 physically coupled to the disk drive housing 12. The VCM top plate 50 comprises a ferromagnetic metal. The disk drive further includes the VCM magnet 48 magnetically coupled to the VCM top plate 50. The disk drive 10 further includes the actuator latch 56 which is contactable with the actuator 30. The latch 56 includes a post opening 64. The latch 56 is pivotably mounted about the support post 60 with the support post 60 disposed in the post opening 64. The disk drive 10 further includes a pivot ball 58 disposed in the post opening 64 and partially protruding from the latch 56 between the VCM top plate 50 and the latch 56 along the post axis 62.

According to various embodiments, the support post 60 may be press-fit attached to the disk drive base 14. In an alternate embodiment, the support post 60 and the disk drive housing 12 may be all a single component having material continuity rather than an assembly of subcomponents. In this regard, the support post 60 may be integrally formed with the disk drive base 14. The support post 60 may be between 30 and 80 micrometers in diameter. While the support post 60 is shown to be solid cylindrical shape, it is contemplated that the geometry of the support post 60 may take various forms. For examples, the support post 60 may have a varying diameter along the post axis and may be hollow.

The pivot ball 58 may comprise various materials, such as a ceramic material or a steel. The pivot ball 58 may be press-fit into the latch 56. The pivot ball 58 may be between 50 and 100 micrometers in diameter for example. In an embodiment, the pivot ball 58 protrudes from the latch 56 between the VCM top plate 50 and the latch 56 along the post axis 62 between 5% and 45% of a diameter of the pivot ball 58.

The pivot ball 58 may be seated upon the support post 60 without contacting the VCM top plate 50. In this regard as seen in FIG. 6, the pivot ball 58 may be between 50 and 150 micrometers from the VCM top plate 50 in a direction parallel to the post axis 62 with the pivot ball 58 seated upon the support post 62. The latch 56 may include a ball seating element 70. The pivot ball 58 may be seated against the latch seating element 70 when the pivot ball 58 is not seated against the support post 62. For example, in the view of FIG. 6, where the latch 56 is moved vertically upward towards the VCM top plate 50, the pivot ball 58 may come into contact with both the VCM top plate 50 and the latch seating element 70 of the latch 56.

Because of the protruding nature of the pivot ball 58 from the latch 56, the pivot ball 58 acts to maintain separation between the latch 56 and the VCM top plate 50. This tends to mitigate the latch 56 from rubbing against the VCM top plate 50. During rotation of the latch 56, the spherical nature of the pivot ball 58 facilitates a substantially point contact between the pivot ball 58 and the VCM top plate 50 (to the extent that the pivot ball 58 and the VCM top plate 50 are even in contact). Thus the utilization of the pivot ball 58 may serve to retain the latch 56 vertically (from a view as seen in FIG. 6) while doing so with a relatively low amount of friction between the latch 56 and the VCM top plate 50.

Moreover, in some embodiments of the present invention, where the pivot ball 58 is moved vertically upward (from a view as seen in FIG. 6), a point of frictional contact between the pivot ball 58 and the VCM top plate 50 is constrained to be relatively close to a pivot axis of the latch 56 (i.e., substantially along the post axis 62). Moments upon the latch 56 due to such frictional contact between the pivot ball 58 and the VCM top plate 50 are substantially negligible as any moment arm tends to be minimal. Such embodiments may thus tend to mitigate against the development of a large moment upon the latch 56 to retard its rotation.

As mentioned above, the latch 56 includes the latching portion 76. The latching portion 76 may be in the shape of a pin such as shown in this particular embodiment. The latching portion 76 is integrally formed with the latch arm portion 74. The latching portion 76 may be at a closer radial distance from the axis of rotation 42 with the latch 56 in the open position (as shown in the embodiments of FIGS. 1, 2 and 4) than it is in a closed position (as shown in the embodiments of FIGS. 3 and 5).

As seen in FIG. 1, the latch 56 is in its biased open position and the actuator 30 is shown in a parked position. The parked position is the disposition that the actuator 30 is configured to come to rest when not performing read or write operations. The actuator 30 includes an actuator longitudinal axis 84 which extends generally along the actuator arms 34.

As mentioned above, the latch 56 may have a biased position of the latch arm portion 74. In this regard, in the embodiment shown, the latch 56 may include a biasing element 78 coupled to the latch arm portion 74. Magnetic interaction with the biasing element 78 results in a biasing force. The biasing element 78 may comprise a magnetic metal, such as a steel ball bearing (e.g. 400 series stainless steel). In this regard, the biasing element 78 may be configured to magnetically interact with the VCM magnet 48 disposed adjacent the actuator 30. In this embodiment, the latch arm portion 74 is biased towards the actuator 30 so as to position the latch 56 in the open position. It is contemplated that the latch 56 could be configured in another embodiment to be biased in a closed position. Other biasing techniques for the latch 56 may be implemented such as through the use of a mechanical spring between the latch 56 and the disk drive base 14.

As mentioned above, the latch 56 is contactable with the actuator 30. In this regard, the latch 56 is capable of being positioned such that rotation of the actuator 30 would contact the latch 56. Thus, to facilitate the latching function of the latch 56, the latching portion 76 is configured to contact the actuator 30 when the latch 56 is in the closed position. In the particular embodiment shown, the actuator 30 includes a catch 80 as seen in FIG. 1. As shown in FIGS. 4 and 5 there is depicted the actuator 30 shown in phantom lining for ease of illustrating the latch 56 below. FIG. 4 depicts the actuator 30 in a parked position and the latch 56 in the open position. FIG. 5 depicts the actuator 30 in a caught position and the latch 56 in the closed position. As seen in the embodiment of FIG. 5 for reference purposes, there is indicated an actuator arm longitudinal axis 84' as indicating the position of the actuator arm longitudinal axis 84 in the parked position. The actuator 30 is shown with a catch path 86 indicated in dashed lining. The catch path 86 depicts an extended arced path and direction the catch 80 moves through upon rotation of the actuator 30. The latching portion 76 may be disposed radially interior to the catch 80 during rotation of the actuator 30 with the latch 56 in the open position.

For angular reference purposes, the latch arm portion 74 is depicted to define a latch arm longitudinal axis 82 generally extending through the length of the latch arm portion 74. As seen in the embodiments of FIGS. 3 and 5 for reference purposes, there is indicated a latch arm longitudinal axis 82' as indicating the position of the latch arm longitudinal axis 82 in the open position.

The latching portion 76 may be of various shapes and sizes and be configured to engage the actuator 30 in alternate ways. For example, the latching portion 76 need not be configured to be positioned radially interior to the catch path 86. Further, rather than contacting the catch 80 as shown, the latching portion 76 could be configured to travel in a channel formed in the actuator 30 and contact a wall or step within the channel upon the actuator 30 being latched.

It is contemplated that the disk drive 10 may be exposed in external forces, such as a mechanical shock event. Where the actuator 30 is in the parked position, such an external force may result in a rotational acceleration having a component about an axis that is parallel to the axis of rotation 42. Where the direction of such rotational acceleration component is such that the disk drive 10 rotates in a clockwise direction (as seen in the view of FIG. 1), the actuator 30 would tend to rotate in an opposite direction. Rotation of the actuator 30 in such a direction would result in the heads 38 being undesirably moved over the disks 18 in an uncontrolled manner.

However, the latch 56 is configured to move from its biased open position to the closed position upon being subjected to the very same rotational acceleration component that would induce the actuator 30 to rotate. In this particular embodiment shown, the actuator 30 is characterized by the latch arm portion 74 extending away from a latch base portion 72. It is contemplated that the latch arm portion 74 has a degree of mass associated with it that would tend to cause the latch 56 to rotate about the post axis 62. Such a configuration may be referred to as an inertial latch configuration.

In the embodiment shown, the latch 56 further may include a mass element 88. The mass element 88 is formed of a material having a density greater than the latch arm portion 74. In this regard, the relative sensitivity of the movement of the latch arm portion 74 to move upon being subjected to a rotational acceleration may be adjusted. The inclusion and/or amount of mass of the mass element 88 may vary depending upon the amount of such sensitivity.

It is understood that the latch 56 need not be of an inertial latch configuration. Other latch mechanisms are contemplated. For example, the latch mechanism needs not to be limited to function to engage the actuator 30 upon substantial rotational acceleration events. Rather, the latch mechanism may be used to serve a latching of the actuator 30 when the actuator 30 is in a parked position for example. Thus, it is only required that the latch 56 be of a nature that it contacts the actuator 30 for whatever purpose and that the latch 56 be of the nature such that it rotates about the post axis 62.

In addition, though not shown, it is contemplated that the latch 56 may further include crash stop features associated with prohibiting the actuator 30 from rotating in a given rotational extreme position.

What is claimed is:

1. A disk drive comprising:
    a disk drive housing including a support post extending from the disk drive housing, the support post defining a post axis;
    an actuator rotatably coupled to the disk drive housing;
    a VCM top plate physically coupled to the disk drive housing, the VCM top plate comprising a ferromagnetic metal;
    a VCM magnet magnetically coupled to the VCM top plate;
    an actuator latch contactable with the actuator, the latch including a post opening, the latch being pivotably mounted about the support post with the support post disposed in the post opening;
    a pivot ball disposed in the post opening and partially protruding from the latch between the VCM top plate and the latch along the post axis; wherein the pivot ball is seated upon and in contact with the support post without contacting the VCM top plate; and wherein the pivot ball pivots on the end of the support post.

2. The disk drive of claim 1 wherein the pivot ball is press-fit into the latch.

3. The disk drive of claim 1 wherein the pivot ball comprises a ceramic material.

4. The disk drive of claim 1 wherein the pivot ball comprises steel.

5. The disk drive of claim 1 wherein the disk drive housing includes a disk drive base, the support post being press-fit attached to the disk drive base.

6. The disk drive of claim 1 wherein the support post and the disk drive housing are all a single component having material continuity rather than an assembly of subcomponents.

7. The disk drive of claim 1 wherein the VCM top plate comprises steel.

8. The disk drive of claim 1 wherein the VCM magnet is physically coupled to the disk drive housing.

9. The disk drive of claim 8 wherein the disk drive housing includes a disk drive base and a cover, the VCM magnet being physically coupled to the disk drive base, the VCM top plate being physically coupled to the cover.

10. The disk drive of claim 1 wherein the pivot ball protrudes from the latch between the VCM top plate and the latch along the post axis between 5% and 45% of a diameter of the pivot ball.

11. The disk drive of claim 1 wherein the pivot ball is between 50 and 150 micrometers from the VCM top plate in a direction parallel the post axis with the pivot ball seated upon the support post.

12. The disk drive of claim 1 wherein the pivot ball is between 50 and 100 micrometers in diameter.

13. The disk drive of claim 1 wherein the support post is between 30 and 80 micrometers in diameter.

* * * * *